United States Patent
Lin et al.

(10) Patent No.: US 8,117,630 B2
(45) Date of Patent: Feb. 14, 2012

(54) OPTICAL DISK PLAYER WITH HEAD FEEDING MECHANISM

(75) Inventors: Hung-Ming Lin, Taipei Hsien (TW); Fang-Rong Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 902 days.

(21) Appl. No.: 12/124,163

(22) Filed: May 21, 2008

(65) Prior Publication Data

US 2008/0295122 A1    Nov. 27, 2008

(30) Foreign Application Priority Data

May 22, 2007    (CN) .......................... 2007 1 0200663

(51) Int. Cl.
  *G11B 7/00*    (2006.01)
(52) U.S. Cl. .......................... 720/671; 720/676; 720/688
(58) Field of Classification Search .................. 720/672, 720/674–680
See application file for complete search history.

(56) References Cited

U.S. PATENT DOCUMENTS

| 6,058,098 | A | 5/2000 | Kato | |
|---|---|---|---|---|
| 6,724,714 | B1 * | 4/2004 | Kato et al. | 720/672 |
| 6,782,547 | B1 * | 8/2004 | Umesaki et al. | 720/674 |
| 2002/0101814 | A1 | 8/2002 | Kato et al. | |
| 2004/0057373 | A1 | 3/2004 | Hoshinaka et al. | |
| 2006/0187801 | A1 * | 8/2006 | Nishidate et al. | 369/125 |
| 2007/0074237 | A1 * | 3/2007 | Izumisawa | 720/691 |

FOREIGN PATENT DOCUMENTS

JP    10269724 A    * 10/1998

OTHER PUBLICATIONS

Machine-Assisted Translation of JP 10269724 A.*

* cited by examiner

*Primary Examiner* — Nathan Danielsen
(74) *Attorney, Agent, or Firm* — Altis Law Group, Inc.

(57) ABSTRACT

An optical disk player includes a chassis, an optical pick-up head including a support member defining a guiding slot, and a guiding member molded integrally with the chassis, wherein the guiding member is received in the guiding slot and the optical pick-up head is slidably supported on the guiding member.

14 Claims, 5 Drawing Sheets

OPTICAL DISK PLAYER WITH HEAD FEEDING MECHANISM

BACKGROUND

1. Field of the Invention

The present invention generally relates to optical disk players, and more particularly, to an optical disk player using a guiding mechanism to guide an optical pick-up head.

2. Description of Related Art

An optical disk player usually includes a chassis, a spindle motor, an optical pick-up head, and a feeding mechanism. The spindle motor and the feeding mechanism are fixed on the chassis. The spindle motor is configured for loading a disk and driving the disk to rotate. The feeding mechanism is configured for supporting the optical pick-up head and driving the optical pick-up head to move along a radial direction of the disk. The optical pick-up head is configured for reproducing information from the disk or recording information to the disk using laser beams.

In operation, the disk is mounted on the spindle motor, and is driven to rotate. The optical pick-up head is driven to move along the radial direction of the disk by the feeding mechanism, and radiates laser beams onto the disk and receives reflected laser beams from the disk to reproduce information from the disk or record information to the disk.

Generally, the feeding mechanism includes a motor, two guide members, four flexible members, four screws, and four mounting seats. The guide members are parallel with each other to support the optical pick-up head thereon. Each end of the guide members is inserted into one of the mounting seat and clipped by one of the flexible members. Each mounting seat is secured on the chassis by a corresponding screw.

However, the conventional feeding mechanism having the above-described structure results in higher costs, because it requires too many fastening components, i.e. two flexible members, two screws, two mounting seats, to fix one of the guide members.

SUMMARY

An optical disk player includes a chassis, an optical pick-up head including a support member defining a guiding slot therein, and a guiding member molded integrally with the chassis, wherein the guiding member is received in the guiding slot and the optical pick-up head is movably supported on the guiding member.

Other systems, methods, features, and advantages of the present optical disk player will be or become apparent to one with skill in the art upon examination of the following drawings and detailed description. It is intended that all such additional systems, methods, features, and advantages be included within this description, be within the scope of the present apparatus, and be protected by the accompanying claims.

BRIEF DESCRIPTION OF THE DRAWINGS

Many aspects of the present optical disk player can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

DETAILED DESCRIPTION

Reference will now be made to the drawings to describe the preferred embodiments of the present optical disk player, in detail.

Figure 1:
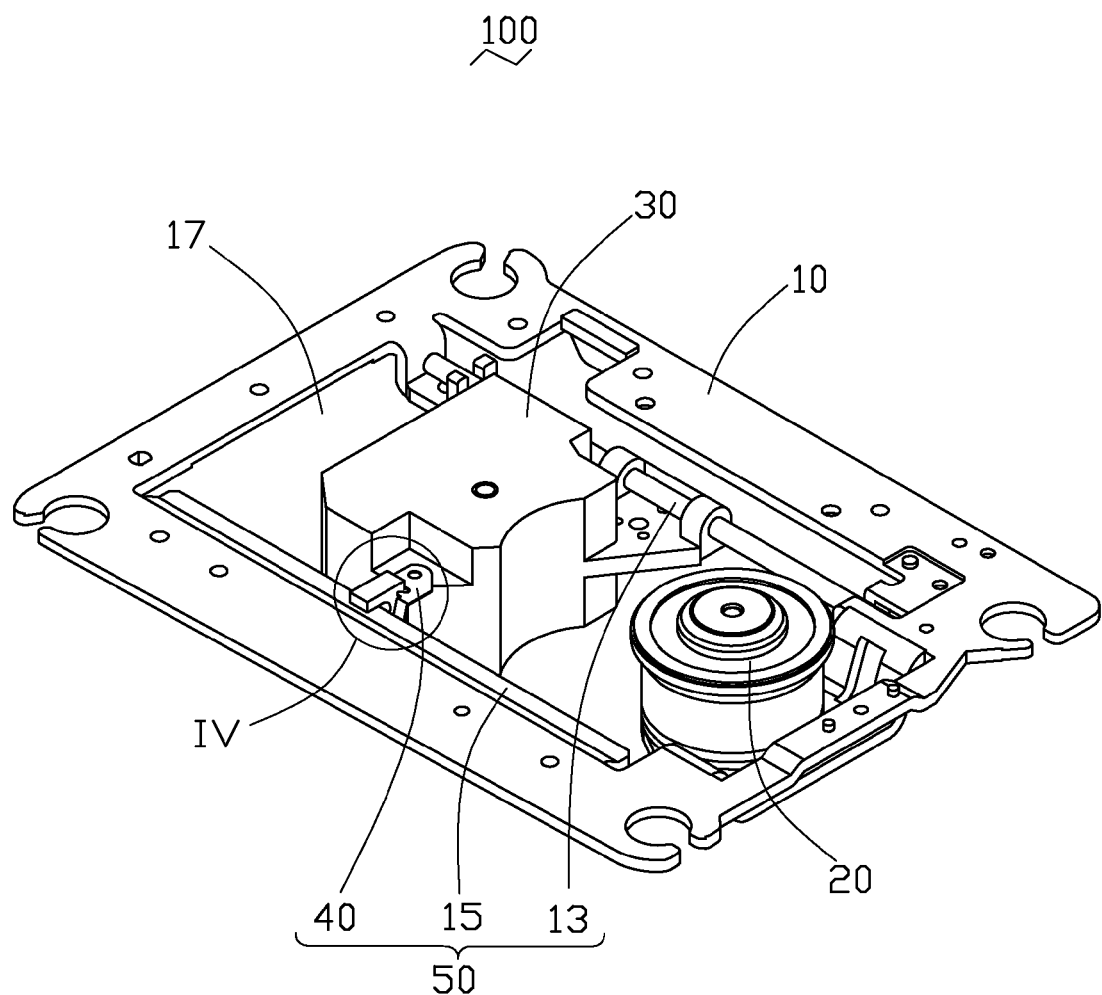
FIG. 1 is an isometric view of a typical optical disk player.

Referring to FIG. 1, a typical optical disk player 100 includes a chassis 10, a spindle motor 20, an optical pick-up head 30, and a feeding module 50. The chassis 10 defines a substantially rectangular opening 17. The spindle motor 20 and the feeding module 50 are fixed on the chassis 10 near the opening 17. The optical pick-up head 30 is movably supported by the feeding module 50. The spindle motor 20 is configured for loading a disk and driving the disk to rotate. The optical pick-up head 30 is configured for emitting laser beams onto the disk and receiving reflected laser beams from the disk to reproduce information from the disk or record information to the disk. The feeding module 50 is configured for supporting and driving the optical pick-up head 30 to move along a radial direction of the disk.

The feeding module 50 includes a motor (not shown), a first guiding member 13, a second guiding member 15, and a resilient member 40. The first guiding member 13 is secured on the chassis 10 and extends across the opening 17. The second guiding member 15 extends from the chassis 10 parallel to the first guiding member 13 and is integrally molded with the chassis 10. The optical pick-up head 30 is slidably supported on the first guiding members 13 and the second guiding member 15.

Figure 2:
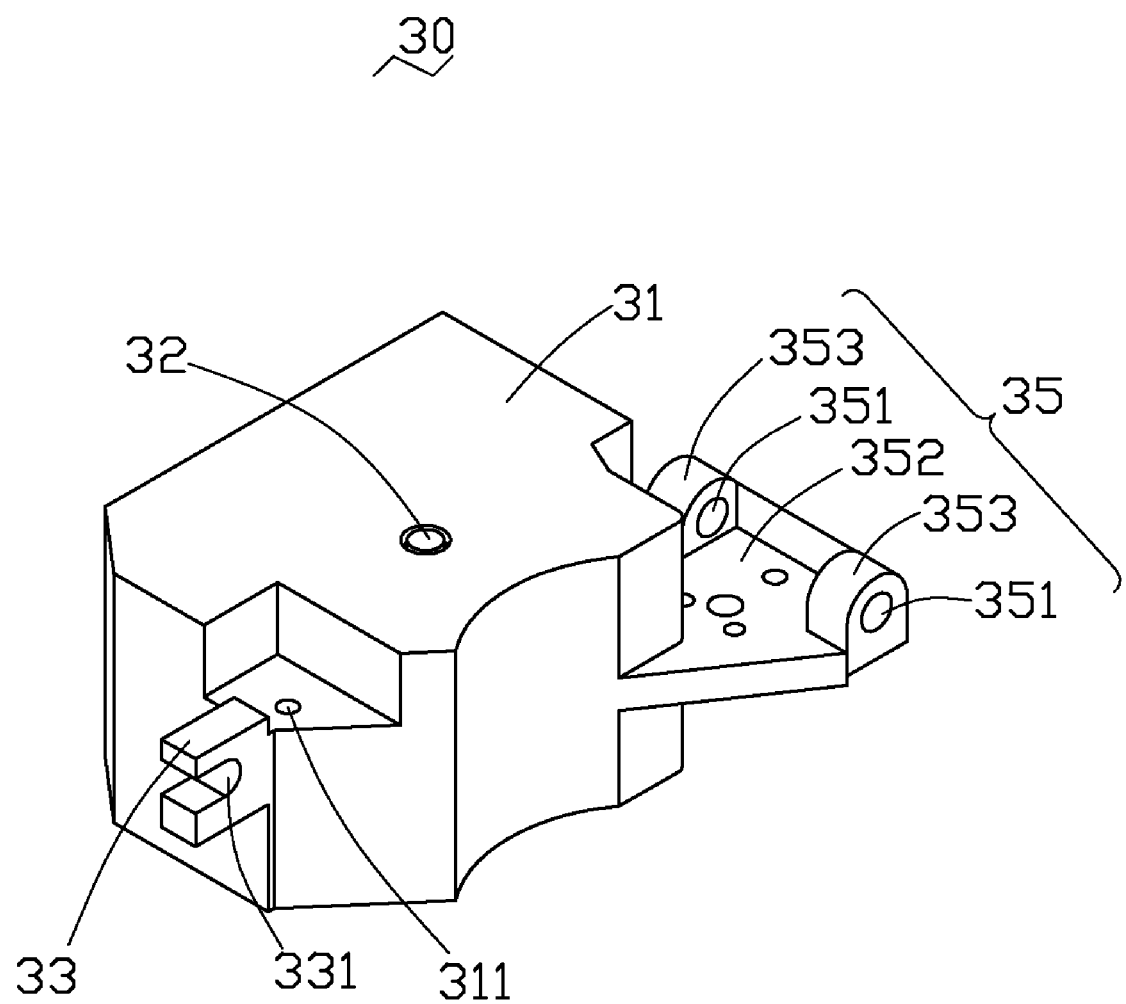
FIG. 2 is an isometric view of the optical pick-up head of FIG. 1.

Further referring to FIG. 2, the optical pick-up head 30 includes a pickup casing 31, a first support member 35, and a second support member 33. The first support member 35 and the second support member 33 extend from opposite sides of the pickup casing 31.

The pickup casing 31 is used for receiving optical elements, such as a lens 32, and defines a mounting hole 311 next to the second support member 33 for receiving a fastening member such as a screw.

The first support member 35 includes an extending sheet 352, and two aligned supporting portions 353 formed on the extending sheet 352. The extending sheet 352 extends from a first side of the pickup casing 31. The supporting portions 353 are formed on two opposite sides of the extending sheet 352 along a direction that is parallel to the first side of the pickup casing 31. Each supporting portion 353 defines a slide hole 351. The slide hole 351 is configured for slidably receiving the first guiding member 13, thus, allowing the first support member 35 to be movably supported on the first guiding member 13.

The second support member 33 is an extending protrusion defining a guiding slot 331. The guiding slot 331 is C-shaped. The guiding slot 331 is used for receiving the second guiding member 15 so as to attach the second support member 33 to the second guiding member 15.

The optical pick-up head 30 is movably supported between the first guiding member 13 and the second guiding member 15 by the first support member 35 and the second support member 33. Therefore, the optical pick-up head 30 is slidably along the direction parallel to the first guiding member 13.

Figure 3:
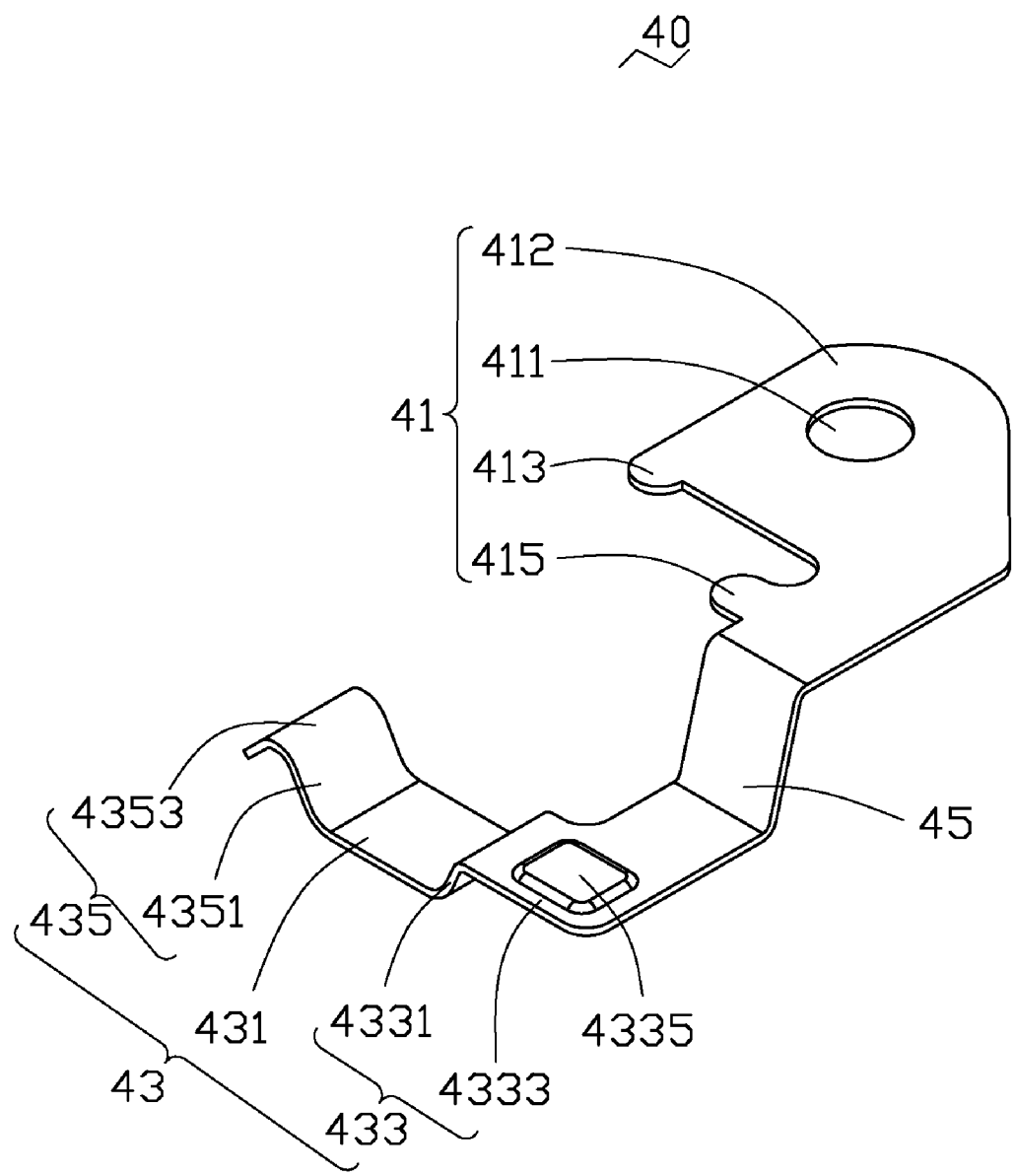
FIG. 3 is an isometric view of the resilient member of FIG. 1.

Further referring to FIG. 3, the resilient member 40 is molded integrally. The resilient member 40 includes a mounting portion 41, a spacer 43, and an extending portion 45. The extending portion 45 is disposed between the spacer 43 and the mounting portion 41.

Figure 4:
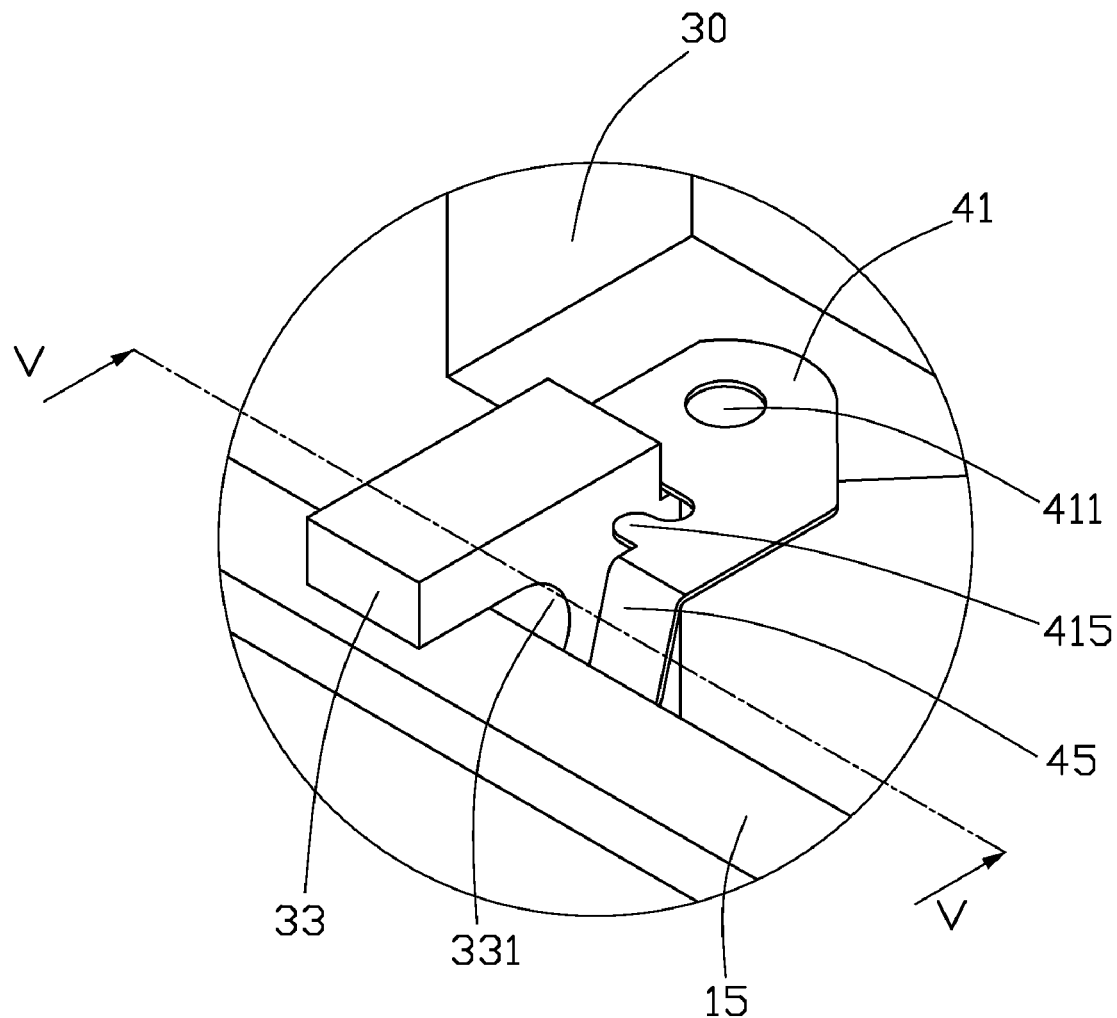
FIG. 4 is a partial enlarged view of a circled portion IV of FIG. 1.
Figure 5:
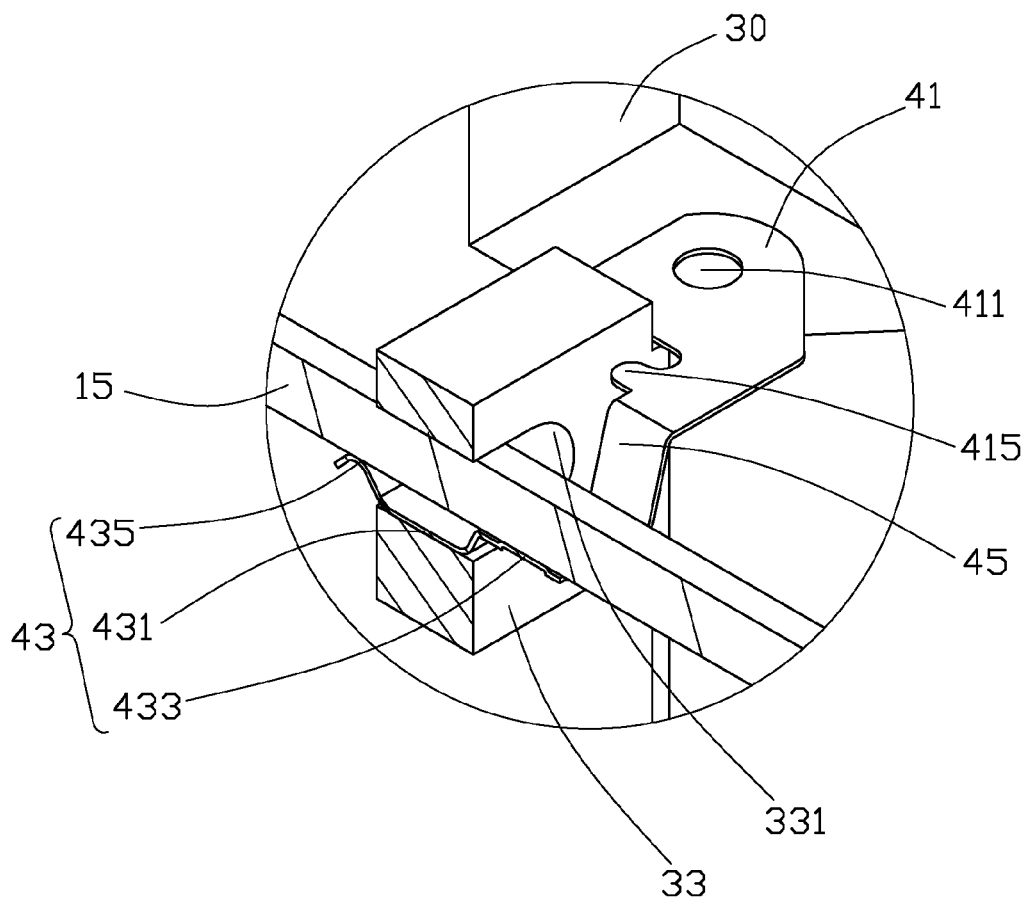
FIG. 5 is a cross-sectional view of the optical pick-up head taken along the line V-V of FIG. 4.

Also referring to FIGS. 4, 5, the mounting portion 41 includes a flat main portion 412 and two clips 413, 415. The main portion 412 defines a fixing hole 411. The clips 413, 415 extend from two end sections of an L-shaped edge of the main portion 412 in two perpendicular directions respectively. The second support member 33 is received, and further, nipped between the clips 413, 415.

The spacer 43 includes a base 431, a first resilient portion 433, and a second resilient portion 435. The first resilient portion 433 and the second resilient portion 435 extend from opposite ends of the base 431. The base 431 is supported on the second support member 33. The first resilient portion 433 and the second resilient portion 435 are configured for supporting the second guiding member 15. The first resilient portion 433 and the second resilient portion 435 can elastically deform to translate a force from collision between the optical pick-up head 30 and the second guiding members 15 into an elastic deformation force.

The base 431 is flat to provide a comparatively large interface area between the base 431 and the second support member 33, and therefore, stability of the optical pick-up head 30 is improved when the optical pick-up head 30 moves along the second guiding member 15.

The first resilient portion 433 includes a first inclined wall 4331 and a platform 4333. The second resilient portion 435 includes a second inclined wall 4351 and an arc end 4353. The first inclined wall 4331 and the second inclined wall 4351 respectively extend upwards, from two opposite ends of the base 431, and away from each other gradually. The platform 4333 is parallel to the base 431, and used for connecting an edge of the first inclined wall 4331 away from the base 431 to the extending portion 45. A protrusion 4335 protrudes from the platform 4333 to provide a comparatively small interface area between the first resilient portion 433 and the second guiding member 15, and therefore, minimizing friction between the first resilient portion 433 and the second guiding member.

The arc end 4353 extends from one end of the second inclined wall 4351 away from the base 431. A top of the arc end 4353 and the protrusion 4335 have a same height above the base 431. The top of the arc end 4353 and the protrusion 4335 are used for supporting the second guiding member 15.

The extending portion 45 is disposed between the mounting portion 41 and the platform 4333. In the typical embodiment, there is only one extending portion 45, in other embodiments, the resilient member 40 could include another extending portion.

A detailed assembly procedure of the optical disk player 100 will be described. Firstly, the fixing member passes though the fixing hole 411 and engages in the mounting hole 311 to fasten the resilient member 40 on the optical pick-up head 30. Therefore, the second support member 33 is clipped between the first clip 413 and the second clip 415 to prevent the resilient member 40 from rotating with respect to the second support member 33. Thus the resilient member 40 is secured to the optical pick-up head 30. The base 431 is received in the guiding slot 331 and supported on the second support member 33. The second guiding member 15 is wedged into the guiding slot 331, and clipped between the spacer 43 and the second support member 33 with one side of the second guiding member 15 elastically supported by the arc end 4353 and the protrusion 4335. Finally, the first guiding member 13 passes through the two slide holes 351, and is fixed on the chassis 10. When the optical pick-up head 30 moves, the force from the collision between the optical pick-up head 30 and the guiding member 15 can be translated into an elastic deformation force of the first resilient portion 433 and the second resilient portion 435. Therefore, the vibration of the optical pick-up head 30 is reduced, and stability of the optical pick-up head 30 is improved.

As above said optical disk player 100, the second guiding member 15 is molded integrally with the chassis 10, thus, other components such as fastening members for fastening the second guide member 15 on the chassis 10 are not required. Therefore, the number of components needed for the optical disk player 100 is reduced, and the optical disk player 100 is more easily assembled. In addition, the resilient member 40 is elastically clipped between the second guiding member 15 and the second support member 33 to fill in the guiding slot 331, thus the optical pick-up head 30 can be kept relatively stable when the optical pick-up head 30 moves along the second guiding member 15 and the first guiding member 13.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An optical disk player comprising:
   a chassis;
   an optical pick-up head comprising a support member defining a guiding slot therein;
   a guiding member molded integrally with the chassis; and
   a resilient member received in the guiding slot and elastically clipped between the guiding member and the support member;
   wherein the guiding member is slidably received in the guiding slot and the optical pick-up head is slidably supported on the guiding member; the resilient member comprises a spacer clipped between the guiding member and the support member, a mounting portion fixed on the optical pick-up head, and an extending portion for connecting the mounting portion to the spacer; one end of the extending portion is inclined from the mounting portion, the other end of the extending portion is inclined from the spacer; the mounting portion comprises two clips, and the support member is clipped between the two clips; the two clips respectively extend from two sections of a L-shaped edge of the mounting portion in two perpendicular directions.

2. The optical disk player as claimed in claim 1, wherein the spacer comprises a base supported on the support member and a first resilient portion extending from the base to support the guiding member.

3. The optical disk player as claimed in claim 2, wherein the first resilient portion comprises a first inclined wall extending upwards from the base.

4. The optical disk player as claimed in claim 3, wherein the first resilient portion further comprises a platform connecting the first inclined wall to the extending portion.

5. The optical disk player as claimed in claim 4, wherein a protrusion protrudes from the platform to support the guiding member.

6. The optical disk player as claimed in claim 5, wherein the spacer further comprises a second resilient portion for supporting the guiding member, and the first resilient portion and the second resilient portion respectively extend from two ends of the base, and the second resilient portion comprises a second inclined wall extending upwards from the base.

7. The optical disk player as claimed in claim 6, wherein the second resilient portion further comprises an arc end extending from the second inclined wall to support the guiding member.

8. The optical disk player as claimed in claim 7, wherein a top of the arc end and the protrusion have the same height above the base.

9. The optical disk player as claimed in claim 4, wherein the platform is flat.

10. The optical disk player as claimed in claim 2, wherein the spacer further comprises a second resilient portion for supporting the guiding member, and the first resilient portion and the second resilient portion respectively extend from two ends of the base.

11. The optical disk player as claimed in claim 10, wherein the second resilient portion comprises a second inclined wall extending upwards from the base.

12. The optical disk player as claimed in claim 11, wherein the second resilient portion further comprises an arc end extending from the second inclined wall to support the guiding member.

13. The optical disk player as claimed in claim 10, wherein tops of the first resilient portion and the second resilient portion have the same height above the base.

14. An optical disk player comprising:
a chassis;
an optical pick-up head comprising a support member defining a guiding slot therein;
a guiding member extending from the chassis; and
a resilient member received in the guiding slot and elastically clipped between the guiding member and the support member;
wherein the guiding member is slidably received in the guiding slot and the optical pick-up head is slidably supported on the guiding member, the resilient member comprises a spacer clipped between the guiding member and the support member; the spacer comprises a first resilient portion and a second resilient portion for supporting the guiding member, and a base supported on the support member; the first resilient portion and the second resilient portion respectively extend from two ends of the base, the first resilient portion comprises a first inclined wall extending upwards from the base, and the second resilient portion comprises a second inclined wall extending upwards from the base.

* * * * *